United States Patent [19]

Kanbe

[11] 4,385,822
[45] May 31, 1983

[54] METHOD AND APPARATUS FOR FORMING AND RECORDING COMPOSITE IMAGES

[75] Inventor: Junichiro Kanbe, Tokyo, Japan

[73] Assignee: Canon Kabushiki Kaisha, Tokyo, Japan

[21] Appl. No.: 245,096

[22] Filed: Mar. 18, 1981

[30] Foreign Application Priority Data

Mar. 25, 1980 [JP] Japan .................................. 55-37905

[51] Int. Cl.³ .......................................... G03G 15/00
[52] U.S. Cl. ................. 355/3 R; 355/14 R; 427/12; 430/39; 430/48; 346/74.2
[58] Field of Search ................ 355/3 R, 14 R, 8; 118/621, 623; 427/12, 13; 430/39, 48, 54, 57; 358/300; 346/74

[56] References Cited

U.S. PATENT DOCUMENTS

| | | | |
|---|---|---|---|
| 3,144,650 | 8/1964 | Levine | 346/74.4 |
| 3,441,938 | 4/1969 | Markgraf | 430/39 X |
| 3,579,250 | 5/1971 | Nelson | 346/74.4 X |
| 3,717,460 | 2/1973 | Duck et al. | 427/12 X |
| 3,781,903 | 12/1973 | Jeffers et al. | 430/39 X |
| 3,939,800 | 2/1976 | Banker | 118/621 X |
| 4,167,324 | 9/1979 | Wu | 355/3 R |
| 4,216,282 | 8/1980 | Edwards et al. | 430/39 |
| 4,251,152 | 2/1981 | Miyakawa et al. | 355/3 R |
| 4,282,303 | 8/1981 | Bergen | 430/39 X |
| 4,291,341 | 9/1981 | Yajima | 355/14 C X |
| 4,298,269 | 11/1981 | Yoshimaru et al. | 355/8 X |
| 4,346,156 | 8/1982 | Faucz | 430/39 |

Primary Examiner—A. C. Prescott
Attorney, Agent, or Firm—Fitzpatrick, Cella, Harper & Scinto

[57] ABSTRACT

Two different picture informations A and B are compounded into a composite picture image making use of the knowledge that a magnetic latent image and an electrostatic latent image do not interfere each other. One of the picture informations A and B is formed as a magnetic latent image and the other is formed as an electrostatic latent image in one and same recording medium so as to form and record a composite latent image therein. Both of the magnetic and electrostatic latent images are developed all at once using one and single developing apparatus to visualize the latent images as a visible composite image.

21 Claims, 6 Drawing Figures

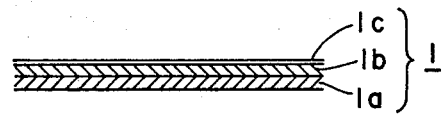
FIG. IA
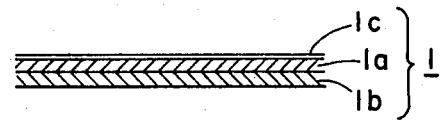
FIG. IB
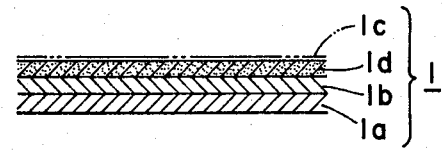
FIG. IC
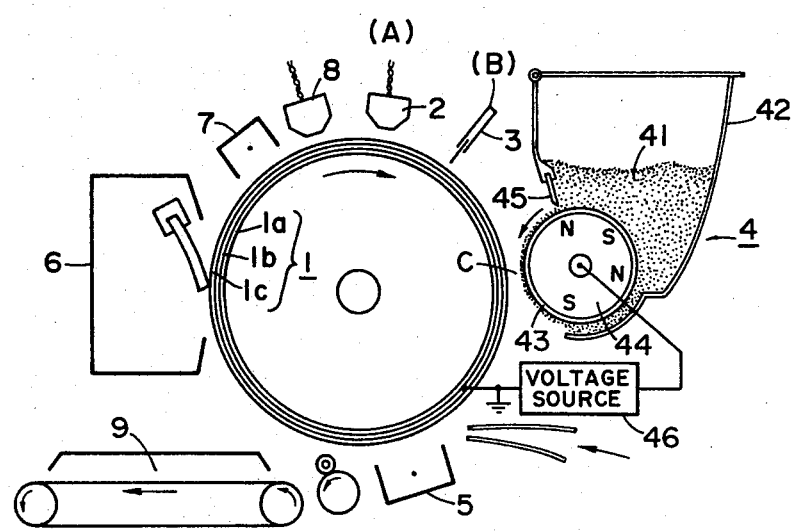
FIG. 2

METHOD AND APPARATUS FOR FORMING AND RECORDING COMPOSITE IMAGES

BACKGROUND OF THE INVENTION

1. Field of the Invention

The present invention relates to a method and apparatus for forming and recording a composite image resulting from a magnetic latent image and an electrostatic latent image.

2. Description of the Prior Art

Xerography is a process which is well known in the art from the disclosure made in U.S. Pat. No. 2,297,691 granted to Carlson. This process is an electrophotography process according to which an electrostatic latent image is formed on a photosensitive medium and then the latent image is developed to produce a copied image. The photosensitive medium used in the process is composed of an electrically conductive substrate and a photoconductive layer provided on the substrate.

As a development of the above electrophotographic process, it is also known to reproduce an image employing a photosensitive medium of three-layer structure which further comprises a transparent insulating layer laid on the above mentioned photoconductive layer. This process is generally called NP process and is disclosed, for example, in U.S. Pat. No. 3,666,363.

Another type of image forming process is disclosed in U. S. Pat. No. 3,250,636 and Japanese Patent Application laid open No. 90,342/1975. This process comprises the steps of forming a magnetic latent image on a magnetic drum using a magnetic recording head, developing the formed latent image with a magnetic toner and transferring the developed image onto a recording paper.

Various methods and apparatus have been proposed in order to compound two different images into a composite image and to record the composite image using the principle of xerography. However, the manner of forming a composite image is common to all of these methods hitherto proposed. Namely, the different electrostatic latent images are compounded to form a composite image on a recording medium, and the composite image is then visualized. Since both of the latent images are electrostatic latent images, selective writing or erasing of any particular part of image information may be realized only with great difficulty and inconvenience. Such realization necessitates use of a very complicated process. The apparatus required to carry out the process becomes unduly expensive, complicated in structure, and large in size.

SUMMARY OF THE INVENTION

Accordingly, it is an object of the invention to provide a composite image forming and recording method and apparatus which enables formation a composite image in a very simple and easy manner as compared with the prior art.

It is another object of the invention to provide a composite image forming and recording method and apparatus which enables the erasure of any one of two latent images A and B as desired, after a composite image of A and B has once been formed on a recording medium, without any adverse effect on the other latent image to be kept alive in the medium. The invention also enables formation of a latent image of another image information (rewriting or writing of image information) selected from a broad selection range of equivalent image composition modes, in every one of which modes a composite image can be obtained very easily.

It is a further object of the invention to provide a composite image forming and recording method and apparatus which enables development of the compounded magnetic image and electrostatic image all at once employing a single developing apparatus.

The present invention, made to attain the above objects, is based on the knowledge that a magnetic latent image and an electrostatic latent image do not interfere with each other. According to the invention, one of the image informations A and B to be compounded into a composite image is formed as a magnetic latent image whereas the other is formed as an electrostatic image. The magnetic latent image of A and the electrostatic latent image of B are formed in one and same recording medium so as to form a composite image therein. The compounded latent images can be visualized all at once by using a developing apparatus operable with magnetic toner.

Other and further objects, features and advantages of the invention will appear more fully from a reading of the following detailed description.

BRIEF DESCRIPTION OF THE DRAWINGS

FIGS. 1A, 1B and 1C illustrate various arrangements of layers in an electromagnetic latent image forming medium used in the invention;

FIG. 2 schematically shows an embodiment of apparatus useful for carrying out the method of the present invention;

DESCRIPTION OF THE PREFERRED EMBODIMENTS

Figure 3:
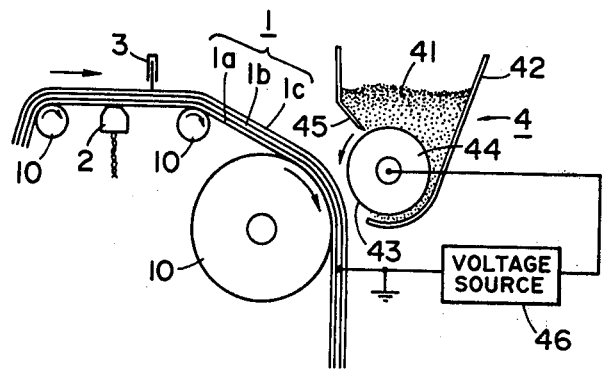
FIGS. 3 and 4 are views similar to FIG. 2 showing other embodiments of apparatus according to the invention.

In FIG. 1 reference numeral 1 generally designates a recording medium used in the invention. The recording medium 1 is such one on which both a magnetic latent image and a electrostatic latent image can be formed. For the purpose of this specification, such recording medium is hereinafter referred to as electromagnetic latent image forming medium.

The electromagnetic latent image forming medium 1 may be of any suitable structure some examples of which are shown in FIGS. 1A, 1B and 1C.

(a) The medium 1 shown in FIG. 1A comprises a magnetic layer 1a, a non-magnetic and electrically conductive layer 1b and an insulating layer 1c arranged in a laminate in this order. The magnetic layer 1a is a thin film formed of magnetic material such as Co-Ni or Co-P. The intermediate layer 1b is a non-magnetic and electrically conductive film formed, for example, by vapour deposition of aluminum. The insulator layer 1c is a thin film (for example 5–30µ in film thickness) formed of electrically insulating material such as polyester.

(b) The medium 2 shown in FIG. 1B also comprises three layers like (a). But, the three layers are arranged in the order of non-magnetic, conductive layer 1b, magnetic layer 1a and insulating layer 1c.

(c) In the medium 1 shown in FIG. 1C, a photoconductive insulating layer 1d is used as an insulating layer. An additional insulating layer 1c may be applied also on the surface of the photoconductive layer 1d. Namely, the electromagnetic latent image forming medium 1 comprises a magnetic layer 1a, a non-magnetic conductive layer 1b, a photoconductive layer 1d and, if desired, a further insulating layer 1c arranged in a laminate in this order.

Since each the above examples of electromagnetic latent image forming medium 1 has a magnetic layer 1a, a magnetic latent image can be formed and retained in the layer 1a. In addition, owing to the presence of an insulating layer 1c or photoconductive insulating layer 1d, it is possible to form an electrostatic latent image and retain the same in the layer 1c or 1d. The electromagnetic latent image forming medium 1 may be used in any desired form such as that of plate type, drum type or belt type.

FIG. 2 illustrates a recording apparatus in which the present invention is embodied. In this embodiment, as the electromagnetic latent image forming medium 1, there is used a medium having the same structure as that shown in FIG. 1A and in the form of drum. The drum 1 is driven into rotation in the direction of arrow. Disposed around the drum 1 are many processing stations 2 to 8 listed below. As viewed in the rotational direction, the drum 1 passes through these stations in the following sequence:

(i) magnetic coil 2 for forming and recording a magnetic latent image of picture information on the magnetic layer 1a of the drum;

(ii) multistylus discharge needle 3 for forming and recording on the insulation layer 1c an electrostatic latent image of picture information;

(iii) developing device 4 for developing the magnetic and electrostatic images formed and recorded on the drum;

(iv) transferring device 5 for transferring the developed images onto a copying material from the drum;

(v) cleaning device 5 for cleaning the drum surface after transferring;

(vi) discharger 7 for erasing the electrostatic image on the insulating layer 1c and (vii) demagnetizing coil 8 for erasing the magnetic latent image on the magnetic layer 1a.

A and B in FIG. 2 indicate two different picture informations to be compounded into a composite image. After being transformed into an electric signal, one of the picture informations, that is, the picture information A is introduced into the recording magnetic coil 2 from an input apparatus such as picture reading apparatus (not shown). With the rotation of the drum 1, magnetic latent images corresponding to the input information A are formed and recorded on the magnetic layer 1a sequentially.

The outer picture information B is, after converting into an electric signal, applied to the multistylus discharge needle 3 from an input apparatus such as picture reading apparatus (not shown). Thus, electrostatic latent images corresponding to the input information B are sequentially formed and recorded on the insulating layer of the dum 1.

The magnetic latent image formed on the magnetic layer 1a and the electrostatic latent image formed on the insulating layer 1c never interfere each other even when one is overlaid on the other in the same area of the drum 1. They can coexist independently of each other in the respective layers 1a and 1c. Therefore, on the surface area which has passed the stations of magnetic coil 2 and multistylus discharge needle 3, the drum has a composite latent image of the picture informations A and B resulting from the above magnetic and electrostatic latent images. To make the composite latent image, of course, it is necessary to synchronously form the magnetic latent image and the electrostatic latent image. Means for synchronizing two latent images is well known in the art and therefore need not be further described.

As the drum rotates, the composite latent image enters the developing station C where the composite latent image is developed by the developing device 4. The developing device is of the type which operates with dielectric and magnetic toner 41 having a preselected electric polarity. As shown in FIG. 2, the developing device 4 is essentially composed of a toner hopper 42, a rotary non-magnetic sleeve 43, a stationary permanent magnet roll 44, a magnetic blade 45 and voltage applying means 46.

The rotary non-magnetic sleeve 43 is disposed horizontally in parallel with the drum 1. About one half of the circumference of the sleeve 43 lies within the hopper 42 and another half of the circumference is exposed to the exterior so as to serve as a member for carrying the developing agent, namely dielectric magnetic toner 41. The permanent magnet roll 44 is inserted into the sleeve 43 and mounted stationary within the latter. The magnetic blade 45 disposed slightly spaced from the outer surface of the rotary sleeve 43 and opposed to one of the main poles of the stationary magnet roll 44. Voltage applying means 46 functions to apply an alternating electric filed between the sleeve 43 and drum 1. Such voltage applying means is known in the art and is disclosed, for example, in U.S. application Ser. No. 58,434 and U.S. Pat. No. 4,292,387. The developing apparatus 4 must be positioned in such manner that the exposed surface of the sleeve 43 is very close to the drum 1 and extends in parallel with the drum surface.

As the dielectric magnetic toner 41 there may be used so-called jumping developing toner as disclosed in the above patent application, U.S. Ser. No. 58,434 and U.S. Pat. No. 4,292,387. An example of preparation of such dielectric magnetic toner 41 is as follows:

| Styrene acrylic resin | 50 wt %, |
| black ferrite | 48 wt % and |
| negative charge controller | 2 wt % | are mixed together and the mixture is kneaded well. After milling, the mixture is classified through screening. Then, 0.2% of colloidal silica is added to the screened powder. In the case of this example, the toner is negatively charged.

The sleeve 43 is driven ito rotation in the direction of arrow of FIG. 2. The circumference of the rotating sleeve 43 passes through under the blade 45 by which toner 41 is applied onto the circumference of sleeve 43 in the form of a thin toner layer without agglomeration. As an example, a uniform thin layer of toner of about $100\mu$ thickness was formed on the circumference of the sleeve 43 under the action of the magnetic field between the blade 45 and the main magnetic pole of N within the sleeve 43 when the distance from blade 45 to sleeve 43 as set to about $250\mu$ and the magnetic flux density on the sleeve surface at the portion of the main pole opposed to the blade was about 700 G.

The circumferential surface of the sleeve carrying thereon the thin toner layer then enters the developing station C facing the drum 1. The minimum distance between dum 1 and sleeve 43 at the developing station C is adjusted to a value a little larger than the thickness of the toner layer on the sleeve. For example, the minimum distance is kept in the range of 100 to 500μ. Also, the magnetic field formed at the developing station C by the magnet roll 44 disposed within the sleeve is adjusted to such intensity which is sufficiently weak for avoiding any breaking of the magnetic latent image on the drum 1. At the developing station C, also an external alternating electric field is applied to the space between drum 1 and sleeve 43 by voltage applying means 46 (for example, frequency: 800 Hz, amplitude: 1600 V and DC component: +100 V).

Under the above condition of the developing station C there occurs a reciprocating motion of toner particles between sleeve 43 and drum 1. However, the magnetic attraction of the magnetic latent image makes the toner finally adhered to the drum surface according to the magnetic latent image pattern. At the same time, the electrostatic attraction of the electrostatic latent image makes the toner finally adhered to the drum surface according to the electrostatic latent image pattern. Thus, passing through the developing station C, the magnetic latent image and electrostatic latent image previously formed on the drum 1 are developed simultaneously so that composite visible image resulting from the two different latent images can be formed on the drum surface.

In this manner, a magnetic latent image and an electrostatic latent image can be developed at the same time employing one and the same developing apparatus making use of the dual property of the toner, namely, the property of its being magnetic for developing the magnetic latent image on one hand and the property of its being dielectric for developing the electrostatic latent image on the other hand. Of course, it is possible to use two separate developing apparatus, one for magnetic latent image and the other for electrostatic latent image.

The developed image on the drum 1 then reaches the transfer station 5 at which the image is transferred onto a transfer material such as paper. The transfer paper is fed from a paper feeding station (not shown) while keeping good timing with the rotation of drum 1. After passing through the transfer station 5, the transfer paper is separated from the drum surface and directed to the fixing station 9 where the developed image is fixed on the transfer paper. After completing the fixation of the image, the paper is discharged from the apparatus as a copy of a desired composite image.

After transfer, toner particles remaining on the drum surface are removed by the cleaning device 6. Subsequently, the electrostatic latent image in the insulating layer 1c is erased by discharger 7 and the magnetic latent image in the magnetic layer 1a is erased by demagnetizing coil 8. Finally, drum arrives in the position for the next cycle of copying operation.

If the same number of magnetic coils 2 as the number of picture elements are arranged in the axial direction of drum 1, then all the steps of the above magnetic latent image forming process, namely steps of latent image formation, developing, transferring and cleaning can be preformed during a single revolution of the drum 1. In another arrangement, the magnetic latent image can be formed using single or few magnetic coils 2 which are scanned in the axial direction of the drum 1 during a number of high speed revolutions of the drum. All other steps of forming an electrostatic latent image, developing, transferring and cleaning can be performed during one revolution of the drum after forming the magnetic latent image. In this case it is advisable that the high voltage to the transfer charger 5 be kept Off and the developing device 4 be held in its retracted position away from the electromagnetic latent image forming medium 1 during the step of forming the magnetic latent image with many revolutions of the drum 1 or that the input to voltage applying means 46 be kept Off and the sleeve 43 be held in the position electrically isolated so as to prevent any development during the step of forming the latent image.

As understood from the foregoing, according to the invention, a composite visible image can be obtained by a very simplified process as compared with the prior art process. According to the prior art, two electrostatic latent images are compounded into a composite latent image. In contrast, according to the invention, a composite latent image is formed from a magnetic latent image and an electrostatic latent image, which images never interfere with each other relative to an electromagnetic latent image forming medium 1 in which said two different latent images are formed. The compounded magnetic latent image and electrostatic latent image are developed simultaneously to produce a composite visible image. The process according to the invention is not only simple but also enables the formation of high quality copies of composite images.

According to the invention various composite images can be obtained rapidly and easily by changing the combination of images. For example, when one wishes to obtain copies of composite images A+B, A+C . . . so on, using the image A as a common image to all combinations, the desired copies can be produced in the following manner.

Initially a latent image of the picture information A is formed in an electromagnetic latent image forming medium 1, for example, as a magnetic latent image. The formed latent image of picture A is stored in memory in the medium 1. On the other hand, an electrostatic latent image of the picture information B is formed and stored in the same medium 1. The above process of developing and transferring is carried out on the formed latent images. Thus, a copy of a composite picture image A+B is obtained. Developing and transferring can be repeated many times until a desired number of copies of the composite image A+B are obtained.

After completing the copying making of A+B, one erases only the latent image of B while keeping the latent image of A alive in the medium 1. After erasing the electrostatic latent image of B by the discharger 7, one forms an electrostatic latent image of new picture information C and makes the formed latent image of C stored in memory in the medium 1. Thus, on the medium 1 there is formed now a latent image of A+C. Using this latent image, one can obtain a desired number of copies of the composite image A+C in the same manner as above.

In this manner, copy making operations of composite images A+B, A+C, A+D . . . can be performed very easily and in a time-saving manner by rewriting only one of the two picture informations while keeping the other alive in the latent image forming medium 1.

The process according to the invention, therefore, allows a rapid writing or rewriting of picture informations and a wide selection range of image composition modes. In every mode, a composite image is obtainable more easily and rapidly than in the prior art process.

While in the above example the common latent image of A has been shown to be formed as a magnetic latent image, it is of course possible to form the common latent image as an electrostatic latent image while forming the latent images of rewritten pictures B, C . . . as magnetic latent images respectively. Also, the order of arrangement of magnetic coil 2 and multistylus discharge needle 3 as well as that of discharger 7 and demagnetizing coil 8 in the apparatus shown in FIG. 2 may be reversed.

FIG. 3 schematically shows another embodiment of the invention.

The apparatus shown in FIG. 3 includes an electromagnetic latent image forming medium 1 in the form of a flexible belt as a whole. The arrangement of layers in the medium 1 corresponds to that shown in FIG. 1A. In this embodiment, the magnetic coil 2 used for forming the magnetic latent image is disposed on the side of the magnetic layer 1a of the medium 1 whereas the multistylus discharge needle 3 used for the electrostatic latent image is disposed on the side of the insulating layer 1c of the medium 1. This arrangement enables to position the magnetic coil 2 at a position sufficiently close to the magnetic layer 1a to permit formation of good magnetic latent images. Designated by 10 is a rotary roller for guiding the belt type electromagnetic latent image forming medium 1.

Figure 4:
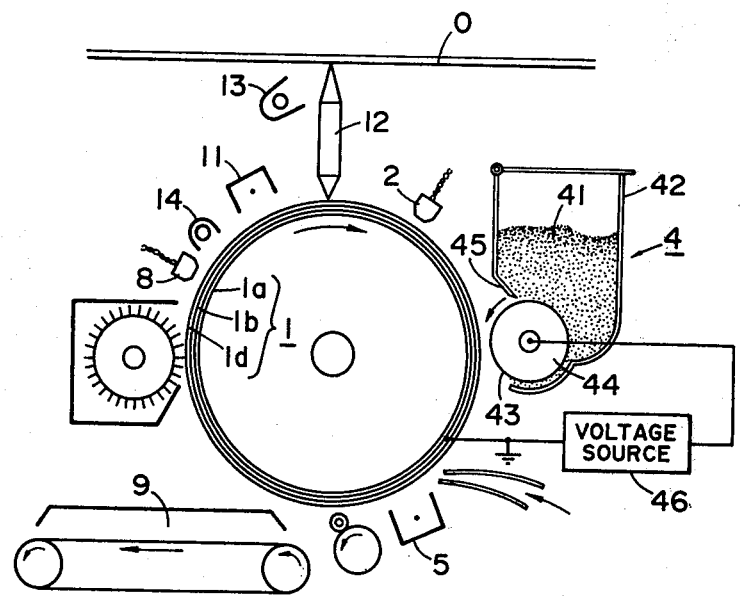

FIG. 4 schematically shows a further embodiment of the invention.

In this embodiment there is used an electromagnetic latent image forming medium 1 in the form of a drum. The arrangement of layers in the medium 1 corresponds to that shown in FIG. 1C. Namely, the medium 1 comprises a magnetic layer 1a, a non-magnetic layer 1b and a photoconductive insulating layer 1d arranged in this order. In the apparatus of this embodiment, electrostatic latent images are formed optically. In accordance with the principle of Xerography, the whole surface of the rotary drum 1 is uniformly precharged using a charger 11. Subsequently to the precharging, the charged, surface of the drum 1 is imagewise exposed to a light image of an original O through an optical system 12. Thereby there is formed in the photoconductive insulating layer 1d an electrostatic latent image corresponding to the image pattern of the original O. This embodiment uses a short focal length lens array as the optical system 12. Designated by 14 is a discharging lamp which functionally corresponds to the discharger 7 in FIG. 2. The discharging lamp 14 serves to erase only the electrostatic latent image. The blade type cleaning device 6 shown in FIG. 2 is replaced by a rotary brush type cleaning device formed of fur or the like. Other members of the apparatus shown in FIG. 4 correspond to those of the apparatus shown in FIG. 2 and therefore need not be further described.

While the invention has been particularly shown and described with reference to preferred embodiments thereof, it will be understood by those skilled in the art that the foregoing and other changes in form and details can be made therein without departing from the spirit and scope of the invention.

What I claim is:

1. Apparatus for forming and recording a composite image employing the process of forming a composite electromagnetic latent image from a magnetic latent image and an electrostatic latent image, said apparatus comprising:

a latent image forming medium comprising a layer capable of forming and retaining a magnetic latent image and a layer capable of forming and retaining an electrostatic latent image;

means for forming a magnetic latent image in said latent image forming medium; and means for forming an electrostatic latent image in said latent image forming medium.

2. Apparatus as set forth in claim 1 which further comprises means for developing said composite electromagnetic latent image resulting from magnetic and electrostatic charges all at once.

3. Apparatus as set forth in claim 2 wherein said developing means develop both the electrostatic latent image and the magnetic latent image at the same time with magnetic toner precharged with electric charge of a preselected polarity, said toner being applied, in the form of a toner layer, on a non-magnetic sleeve containing therein a permanent magnet and disposed opposed to said latent image forming medium with a space therebetween larger than the thickness of said toner layer while applying an alternating electric field to said space between the medium and sleeve.

4. Apparatus as set forth in claim 2 which further comprises latent image erasing means for erasing the electrostatic latent image and/or magnetic latent image after transferring said developed image onto a recording paper.

5. Apparatus as set forth in claim 4 wherein said latent image erasing means comprises a magnetic erasing head.

6. Apparatus as set forth in claim 4 wherein said latent image erasing means comprises a corona discharger.

7. Apparatus as set forth in claim 4 wherein said latent image erasing means comprises an erasing lamp.

8. Apparatus as set forth in claim 1 or 2 wherein said latent image forming medium comprises a magnetic layer, a non-magnetic and electrically conductive layer and an electrically insulating layer arranged in a laminate in this order.

9. Apparatus as set forth in claim 1 or 2 wherein said latent image forming medium comprises a non-magnetic and electrically conductive layer, a magnetic layer and an electrically insulating layer arranged in a laminate in this order.

10. Apparatus as set forth in claim 1 or 2 wherein said latent image forming medium comprises a magnetic layer, a non-magnetic and electrically conductive layer and a photoconductive insulating layer arranged in a laminate in this order.

11. Apparatus as set forth in claim 1 or 2 wherein said latent image forming medium comprises a magnetic layer, a non-magnetic and electrically conductive layer, a photoconductive insulating layer and an insulating layer arranged in a laminate in this order.

12. Apparatus for forming and recording a composite image employing the process of forming a composite electromagnetic latent image from a magnetic latent image and an electrostatic latent image, said apparatus comprising:

a latent image forming medium comprising a layer capable of forming and retaining a magnetic latent image and a layer capable of forming and retaining an electrostatic latent image;

a magnetic head for forming a magnetic latent image in said latent image forming medium;

a discharge needle for forming an electrostatic latent image in said latent forming medium; and a developing device for developing the composite electromagnetic latent image resulting from magnetic and electrostatic charges all at once.

13. Apparatus as set forth in claim 1 which further comprises a corona discharger for erasing said electrostatic latent image and a magnetic head for erasing said magnetic latent image.

14. Apparatus for forming and recording a composite image employing the process of forming a composite electromagnetic latent image from a magnetic latent image and an electrostatic latent image, said apparatus comprising:
    a latent image forming medium comprising a layer capable of forming and retaining a magnetic latent image and a layer capable of forming and retaining an electrostatic latent image;
    means for forming a magnetic latent image in said latent image forming medium, said means being disposed opposed to said magnetic latent image retaining layer;
    means for forming an electrostatic latent image in said latent image forming medium, said means being disposed opposed to said electrostatic latent image retaining layer; and
    a developing device for developing the composite electromagnetic latent image resulting form magnetic and electrostatic charges all at once.

15. Apparatus as set forth in claim 14 wherein said latent image forming medium is in the form of a belt.

16. Apparatus as set forth in claim 14 wherein said latent image forming medium comprises a magnetic layer, a non-magnetic and electrically conductive layer and an electrically insulating layer arranged in a laminate in this order.

17. Apparatus for forming and recording a composite image employing the process of forming a composite electromagnetic latent image from a magnetic latent image and an electrostatic latent image, said apparatus comprising:
    a latent image forming medium comprising a layer capable of forming and retaining a magnetic latent image and a layer capable of forming and retaining an electrostatic latent image;
    means for forming a magnetic latent image in said latent image forming medium;
    means for forming an electrostatic latent image in said latent image forming medium by imagewise exposure; and
    a developing device for developing the composite electromagnetic latent image resulting from magnetic and electrostatic charges all at once.

18. Apparatus as set forth in claim 17 which further comprises a lamp for erasing the electrostatic latent image and a magnetic head for erasing the magnetic latent image.

19. Apparatus as set forth in claim 17 wherein said latent image forming medium comprises a magnetic layer, a non-magnetic and electrically conductive layer and a photoconductive insulating layer arranged in a laminate in this order.

20. Apparatus as set forth in claim 17 wherein said latent image forming medium comprises a magnetic layer, a non-magnetic and electrically conductive layer, a photoconductive insulating layer and an insulating layer arranged in a laminate in this order.

21. Apparatus as set forth in any one of claims 12, 14 and 17 wherein said developing means develop both of the magnetic and electrostatic latent images at the same time with magnetic toner precharged with electric charge of preselected polarity, said toner being applied, in the form of toner layer, on a non-magnetic sleeve containing therein a permanent magnet and disposed opposed to said latent image forming medium with a space therebetween larger than the thickness of said toner layer while applying an alternating electric field to said space between the medium and sleeve.

* * * * *

UNITED STATES PATENT AND TRADEMARK OFFICE
CERTIFICATE OF CORRECTION

PATENT NO. : 4,385,822

DATED : May 31, 1983

INVENTOR(S) : JUNICHIRO KANBE

It is certified that error appears in the above-identified patent and that said Letters Patent is hereby corrected as shown below:

In the Abstract line 4, after "interfere" insert --with--.

Col. 1, line 56, after "formation" insert --of--.

Col. 2, line 42, change "and a" to --and an--.

Col. 3, line 36, change "5" to --6--;

line 52, change "outer" to --other--;

line 58, change "dum" to --drum--;

line 61, after "interfere" insert --with--.

Col. 4, line 29, change "filed" to --field--;

line 52, change "ito" to --into--;

line 62, change "as" to --was--;

UNITED STATES PATENT AND TRADEMARK OFFICE
CERTIFICATE OF CORRECTION

PATENT NO. : 4,385,822

DATED : May 31, 1983

INVENTOR(S) : JUNICHIRO KANBE

Page 2 of 2

It is certified that error appears in the above-identified patent and that said Letters Patent is hereby corrected as shown below:

Col. 4 line 68, change "dum" to --drum--.

Col. 5, line 17, change "adhered" to --adhere--;

line 20, change "adhered" to --adhere--;

line 61, change "preformed" to --performed--.

Col. 6, line 58, change "performed" to --performed--.

Col. 8, line 68, after "latent" insert --image--.

Signed and Sealed this

Twenty-fourth Day of January 1984

[SEAL]

Attest:

GERALD J. MOSSINGHOFF

Attesting Officer

Commissioner of Patents and Trademarks